(12) United States Patent  
Rydin

(10) Patent No.: US 6,302,155 B1
(45) Date of Patent: Oct. 16, 2001

(54) FOUR-LAYER SEAMED PRESS FABRIC

(75) Inventor: Björn Rydin, Hörby (SE)

(73) Assignee: Albany International AB, Halmstad (SE)

( * ) Notice: Subject to any disclaimer, the term of this patent is extended or adjusted under 35 U.S.C. 154(b) by 0 days.

(21) Appl. No.: 09/616,266

(22) Filed: Jul. 14, 2000

(51) Int. Cl.$^7$ .......................... D03D 23/00; D03D 25/00
(52) U.S. Cl. .................... 139/383 AA; 139/383 A
(58) Field of Search ................... 139/383 AA, 383 A, 139/383 R

(56) References Cited

U.S. PATENT DOCUMENTS

| 4,186,780 | * | 2/1980 | Josef et al. ................... 139/383 A |
| 4,206,787 | * | 6/1980 | Strandly ....................... 139/383 A |
| 4,244,084 | * | 1/1981 | Gisbourne ......................... 24/33 C |
| 4,476,902 | * | 10/1984 | Westhead ...................... 139/383 R |
| 4,649,619 | * | 3/1987 | Romanski ........................... 29/433 |
| 4,827,579 | * | 5/1989 | Gisbourne ........................... 24/391 |
| 4,865,083 | | 9/1989 | Cunnane . |
| 4,887,648 | | 12/1989 | Cunnane . |
| 4,896,702 | * | 1/1990 | Crook .......................... 139/383 A |
| 5,476,123 | | 12/1995 | Rydin . |
| 5,531,251 | | 7/1996 | Rydin . |
| 5,875,822 | * | 3/1999 | Fargeout ..................... 139/383 AA |

FOREIGN PATENT DOCUMENTS

2178766 * 2/1987 (GB) ............................ D03D/11/00

* cited by examiner

*Primary Examiner*—John J. Calvert
*Assistant Examiner*—Robert H. Muromoto, Jr.
(74) *Attorney, Agent, or Firm*—Pitney, Hardin, Kipp & Szuch, LLP

(57) ABSTRACT

An on-machine-seamable press fabric for the press section of a paper machine includes a multi-layered integrally woven base fabric having two systems of machine-direction yarns forming seaming loops along each of its two widthwise edges. A seaming spiral is attached to the seaming loops in both rows at each of the two widthwide edges. The two seaming spirals are used to join the press fabric into endless form during installation on the press section of a paper machine.

18 Claims, 4 Drawing Sheets

FOUR-LAYER SEAMED PRESS FABRIC

BACKGROUND OF THE INVENTION

1. Field of the Invention

The present invention relates to the papermaking arts. More specifically, the present invention relates to a papermaker's fabric of the on-machine-seamable variety, such as an on-machine-seamable press fabric for the press section of a paper machine.

2. Description of the Prior Art

During the papermaking process, a fibrous web is formed by depositing a fibrous slurry, that is, an aqueous dispersion of cellulosic fibers, on a moving forming fabric in the forming section of a paper machine. A large amount of water is drained from the slurry through the forming fabric during this process, leaving the fibrous web on the surface of the forming fabric.

The newly formed web proceeds from the forming section to a press section, which includes a series of press nips. The fibrous web passes through the press nips supported by a press fabric, or, as is often the case, between two press fabrics. In the press nips, the fibrous web is subjected to compressive forces which squeeze water therefrom, and which adhere the fibers in the web to one another to turn the fibrous web into a sheet. The water is accepted by the press fabric or fabrics and, ideally, does not return to the web.

The web, now a sheet, finally proceeds to a dryer section, which includes at least one series of rotatable dryer drums or cylinders, which are internally heated by steam. The sheet itself is directed in a serpentine path sequentially around each in the series of drums by a dryer fabric, which holds the web closely against the surfaces of the drums. The heated drums reduce the water content of the sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

Referring, for the moment, specifically to press fabrics, it should be recalled that, at one time, press fabrics were supplied only in endless form. This is because a newly formed paper sheet is extremely susceptible to marking in the press nip by any nonuniformity in the press fabric or fabrics. An endless, seamless fabric, such as one produced by the process known as endless weaving, has a uniform structure in both its longitudinal (machine) and transverse (cross-machine) directions. A seam, such as a seam which may be used to close the press fabric into endless form during installation on a paper machine, represents a discontinuity in the uniform structure of the press fabric. The use of a seam, then, greatly increases the likelihood that the paper sheet will be marked in a press nip.

Accordingly, the seam region of any workable on-machine-seamable press fabric must generally behave under load, that is, under compression in the press nip or nips, like the rest of the press fabric, and must have the same permeability to water and to air as the rest of the press fabric, in order to minimize, if not entirely avoid, the marking of the paper product being manufactured by the seam region.

Despite the considerable technical obstacles presented by these requirements, it remained highly desirable to develop an on-machine-seamable press fabric, because of the comparative ease and safety with which it could be installed on the press section. Ultimately, these obstacles were overcome with the development of press fabrics having seams formed by providing seaming loops on the crosswise edges of the two ends of the fabric. The seaming loops themselves are formed by the machine-direction (MD) yarns of the fabric. A seam is formed by bringing the two ends of the press fabric together, by interdigitating the seaming loops at one end of the fabric with those at the other end, and by directing a so-called pin, or pintle, through the passage defined by the interdigitated seaming loops to lock the two ends of the fabric together. Needless to say, it is much easier and far less time-consuming to install an on-machine-seamable press fabric, than it is to install an endless press fabric, on a paper machine.

There are several methods for producing a press fabric that can be joined into endless form on the paper machine with such a seam. One method is to flat-weave the press fabric, in which case the warp yarns would be its machine-direction (MD) yarns. To form the seaming loops in this method, the warp ends are woven some distance back into the fabric body in a direction parallel to the warp yarns. Another technique, far more preferable, is a modified form of endless weaving, which normally is used to produce an endless loop of fabric. In modified endless weaving, the weft, or filling, yarns are continuously woven back and forth across the loop, in each passage forming a loop on one of the edges of the fabric being woven by passing around a loop-forming pin. As the weft yarn, or filling yarn, which ultimately becomes the MD yarn in the press fabric, is continuous, the seaming loops obtained in this manner are stronger, and the seam formed with such seaming loops has a greater load-bearing capacity, than any that can be produced by weaving the warp ends back into the ends of a flat-woven fabric. In still another method, a fabric is woven endless, and the endless loop of fabric thereby obtained is flattened and given the form of two fabric layers joined to one another at two widthwise ends of the flattened loop. One or more widthwise yarns are then removed from each of the two widthwise ends to produce a short gap defined by the freed, that is, the newly unwoven portions of, lengthwise yarns at each end. These unwoven portions of the lengthwise yarns are then used as seaming loops when the two widthwise ends are brought together as described above.

For the manufacture of certain paper grades, such as linerboard and corrugating media, press fabrics having high void volume and high water-handling capacity are needed. Multi-layered press fabrics, such as those shown in U.S. Pat. Nos. 4,865,083 and 4,887,648 to Cunnane, are useful for such applications.

These patents issued from related applications, and show a method for seam formation for a press fabric having at least four machine-direction layers. In the disclosed method, a woven base fabric, having at least four layers in the machine direction, is provided with seaming loops at each of two ends to be joined together. The seaming loops finish at least two of the layers. That is to say, at the two ends of the fabric, a machine-direction (MD) yarn from one of the at least four layers forms a seaming loop and reenters the fabric in another of the at least four layers, the same two layers being so related at each end, thereby finishing the two layers in question. The remaining layers are finished in a similar manner with or without seaming loops. By altering the choice of which of the layers are finished in seaming loops, the geometry of the seam can be varied.

The present invention is also a multi-layered press fabric, but is designed to be seamed into endless form during installation on a paper machine more readily than those shown in U.S. Pat. Nos. 4,865,083 and 4,887,648.

SUMMARY OF THE INVENTION

Accordingly, the present invention is an on-machine-seamable press fabric for the press section of a paper machine. The press fabric comprises a system of first machine-direction (MD) yarns, a system of second machine-direction (MD) yarns, and at least one system of cross-machine-direction (CD) yarns. The CD yarns are interwoven with the systems of first and second MD yarns to form an integrally woven multi-layered structure in a rectangular shape with a length, a width, two lengthwise edges and two widthwise edges. The first and second MD yarns form first and second seaming loops, respectively, along each of the two widthwise edges. The first and second seaming loops may be in two distinct rows separated from one another in a thicknesswise direction of the press fabric.

A first seaming spiral is attached to at least one of the first and second seaming loops at one of the two widthwise edges of the press fabric by a first pintle. Similarly, a second seaming spiral is attached to at least one of the first and second seaming loops at the other of the two widthwise edges of the press fabric by a second pintle.

The on-machine-seamable press fabric is joined into endless form during installation on the press section of a paper machine by interdigitating the coils of the first and second seaming spirals and by directing a third pintle through the passage defined by the interdigitated coils.

The present invention will now be described in more complete detail, with frequent reference being made to the drawings identified below.

DETAILED DESCRIPTION OF THE PREFERRED EMBODIMENTS

Figure 1:
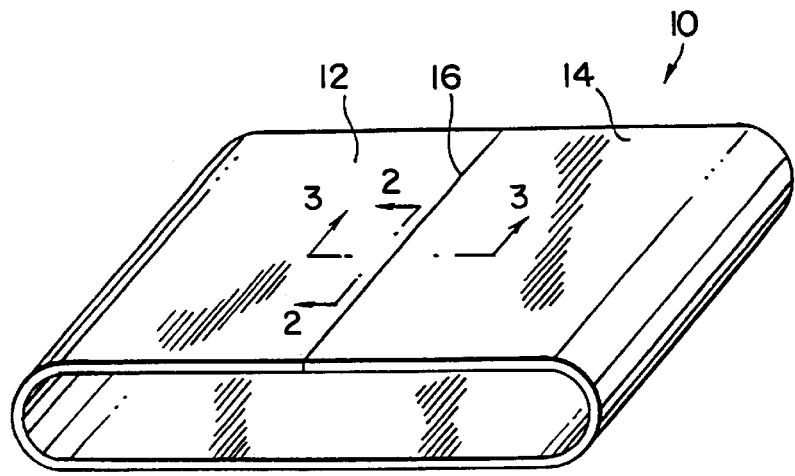
FIG. 1 is a schematic perspective view of the on-machine-seamable press fabric of the present invention.

Turning now specifically to the figures, FIG. 1 is a schematic perspective view of an on-machine-seamable press fabric 10. The press fabric 10 takes the form of an endless loop once its two ends 12, 14 have been joined to one another at seam 16.

Figure 2:
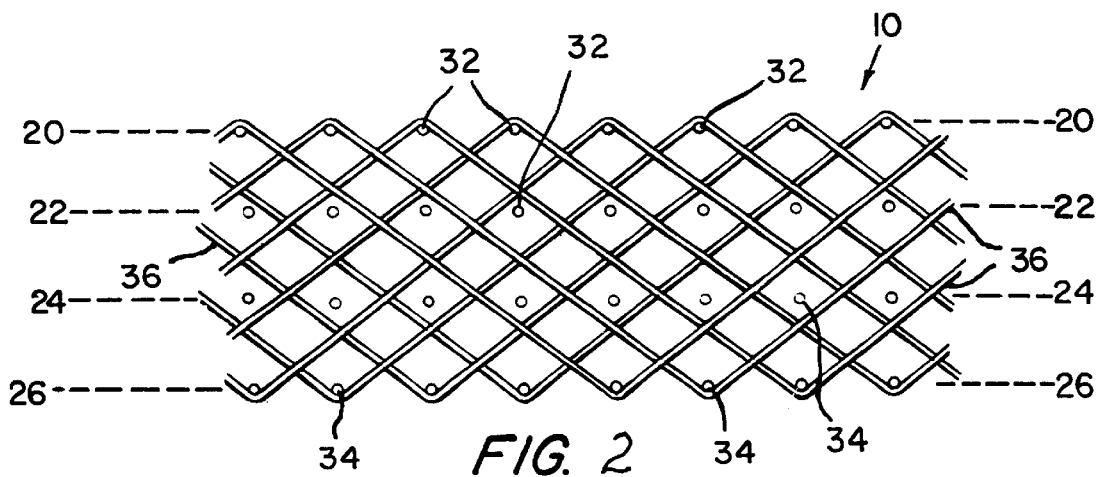
FIG. 2 is a cross-sectional view taken as indicated by line 2—2 in FIG. 1.

FIG. 2 is a cross-sectional view of press fabric 10 taken as indicated by line 2—2 in FIG. 1. As such, the cross section is taken in the transverse, or cross-machine, direction, and shows its cross-machine-direction (CD) yarns from the side and its machine-direction (MD) yarns in cross section.

As shown, on-machine-seamable press fabric 10 is an integrally woven four-layered structure comprising four layers 20,22,24,26 of MD yarns. The press fabric 10 is woven in accordance with a modified endless weaving process as described above, and has a system of first MD yarns 32 and a system of second MD yarns 34. First MD yarns 32 form the top two layers 20,22 in FIG. 2, and second MD yarns 34 form the bottom two layers 24,26. First MD yarns 32 and second MD yarns 34 are weft yarns during the weaving process, and, as will be seen below, form seaming loops at two widthwise edges of the on-machine-seamable press fabric 10.

The system of first MD yarns 32 and the system of second MD yarns 34 are interwoven with at least one system of CD yarns 36, which are the warp yarns during the weaving process. It should be understood that the weave pattern shown is only an example of the many which may be used for this purpose.

First MD yarns 32, second MD yarns 34 and CD yarns 36 may each be of any of the yarn types used to weave paper machine clothing. That is to say, monofilament yarns, which are monofilament strands used singly, or plied/twisted yarns, in the form of plied monofilament or plied multifilament yarns may be used as any of these yarns.

Further, the filaments comprising first MD yarns 32, second MD yarns 34 and CD yarns 36 are extruded from synthetic polymeric resin materials, such as polyamide, polyester, polyetherketone, polypropylene, polyaramid, polyolefin and polyethylene terephthalate (PET) resins, and incorporated into yarns according to techniques well-known in the textile industry and particularly in the paper machine clothing industry.

Figure 3:
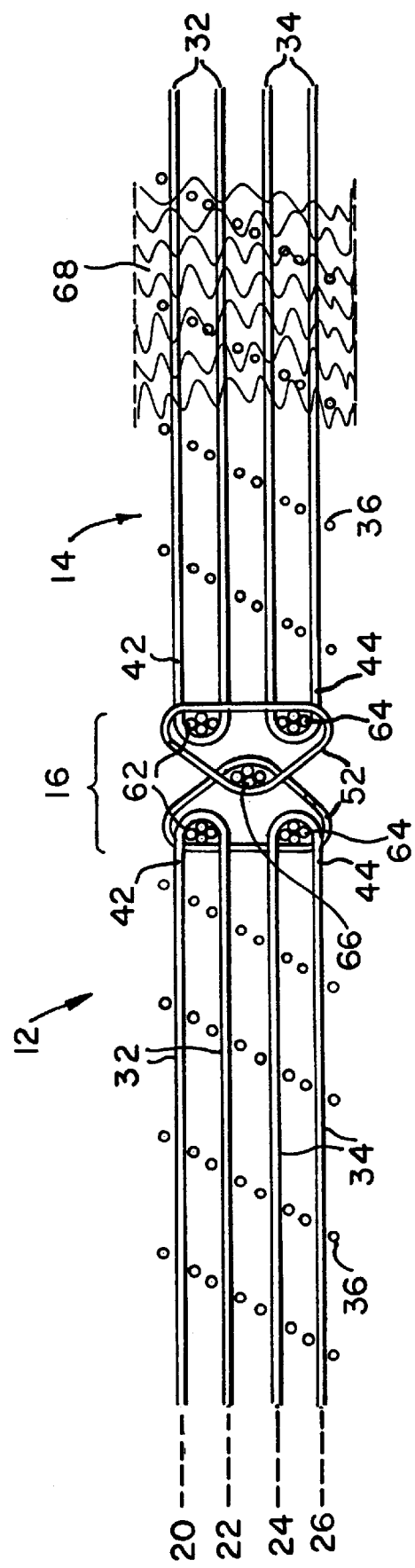
FIG. 3 is a cross-sectional view taken as indicated by line 3—3 in FIG. 1.

FIG. 3 is a cross-sectional view of seam 16 of on-machine-seamable press fabric 10 taken as indicated by line 3—3 in FIG. 1. First MD yarns 32 form first seaming loops 42 at the two ends 12,14 of the press fabric 10. Likewise, second MD yarns 34 form second seaming loops 44 at the two ends 12,14. First seaming loops 42 and second seaming loops 44 form two rows extending along the widthwise edges of press fabric 10. As shown, the first seaming loops 42 are vertically stacked relative to the second seaming loops 44, although it should be understood that they may also be longitudinally offset from one another in the machine direction.

As stated previously, press fabric 10 is integrally woven according to a modified endless weaving process. First seaming loops 42 and second seaming loops 44 are formed by first MD yarns 32 and second MD yarns 34, respectively, both of which are weft yarns during the weaving process. First seaming loops 42 and second seaming loops 44 are each formed by a separate loop-forming pin. At the conclusion of the weaving process, the loop-forming pins (not illustrated) are removed to produce an open-ended fabric having the above-described two rows of seaming loops, one row being of first seaming loops 42 and the other row being of second seaming loops 44, along the widthwise edges of the press fabric 10.

In accordance with the present invention, a seaming spiral 52 is connected to each of the two ends 12,14 of the press fabric 10. The seaming spirals 52 are connected to both of the first seaming loops 42 and second seaming loops 44 at each of the two ends of the press fabric 10 by pintles 62 and pintles 64, respectively. The seaming spirals 52 may be attached to the two ends 12,14 concurrently with the removal of the loop-forming pins. This may be necessary where either the first MD yarns 32 or the second MD yarns 34 are plied/twisted yarns, since seaming loops formed therefrom tend to rotate from the ideal geometry required for interdigitation and seaming, and tend to be easily deformed. Alternatively, the seaming spirals 52 may be attached to the seaming loops 42,44 at the two ends 12,14 of the press fabric 10 at a later time during its processing, such as, for example, after staple fiber material has been needled thereinto, the loop-forming pin removed and the seaming loops 42,44 at the two ends 12,14 separated from one another.

Pintles 62 and pintles 64 may be single strands of monofilament; multiple strands of monofilament untwisted about one another, or plied, twisted, braided or knitted together; or of any of the other pintle types used to close seams in paper machine clothing. These pintles 62,64 may be extruded from the same synthetic polymeric resin materials as are used to produce the yarns 32,34,36 from which the press fabric 10 is woven.

As for the seaming spirals 52, they are monofilament spirals extruded from a polymeric resin material, which is preferably a polyamide resin, but could also be a polyester, polyetherketone, polypropylene, polyolefin or polyethylene terephthalate (PET) resin. The monofilament diameter may be, for example, 0.40 mm or 0.50 mm. During the installation of press fabric 10 on a paper machine, seaming spirals 52, being of monofilament, may be readily interdigitated with one another and joined to one another by directing pintle 66 through the passage defined by the interdigitated coils of the seaming spirals 52. Stuffer yarns may be inserted within the seaming spirals 52 to ensure that seam 16 has permeability characteristics similar to those of the rest of the fabric 10.

Like pintles 62 and pintles 64, pintle 66 may be a single strand of monofilament; multiple strands of monofilament untwisted about another, or plied, twisted, braided or knitted together; or of any of the other pintle types used to close seams in paper machine clothing. Pintle 66 may alternatively be shaped, which is to say that it may have a non-circular cross section, so that it will properly fill the volume within the interdigitated seaming spirals 52 to ensure that the caliper and pressure uniformity of seam 16 is like that of the body of the fabric 10. Moreover, pintles 66 may also be extruded from the same synthetic polymeric resin materials as are used to produce the yarns 32,34,36 from which the press fabric 10 is woven.

Several layers of staple fiber material 68 may be attached to each side of press fabric 10 and entangled through its structure by needling or hydroentanglement. For the sake of clarity, staple fiber material 68 is shown in only a portion of FIG. 3. Staple fiber material 68 may comprise staple fibers of a polymeric resin material, such as polyamide or polyester.

The importance that the seam area of the fabric has characteristics of flow resistance and uniformity of pressure distribution like those of the body of the fabric is well known. This is necessary to prevent the wet paper sheet from being marked by the seam as it passes through a press nip with the fabric. A four-layer integrally woven fabric having one set of seaming loops at each end marks a wet paper sheet due to the significant difference between the aforementioned characteristics of the seam and the body of the fabric. A four-layer integrally woven fabric having two sets of seaming loops at each end does not mark a wet paper sheet as seriously, but is more difficult to join into endless form on a paper machine than one having a single set of seaming loops at each end. The seaming spirals of the present invention make it easier and faster to do so because only one pintle is required to close the seam. The spiral spacing and uniformity are also better than those of woven loops, contributing to the ease and speed with which the fabric may be joined into endless form. Further, it is well known that any non-single-monofilament yarn, either twisted (cabled, plied, etc.) or untwisted, forms a seaming loop having a poor geometry relative to adjacent seaming loops, or a more pliable loop relative thereto. In either case, it becomes difficult to interdigitate the seaming loops on a paper machine to form a seam. If one or both of the sets of seaming loops are formed by yarns of the non-single-monofilament type, it is difficult, if not impossible, to join the fabric into the form of an endless loop in a timely manner. The seaming spirals of the present invention permit yarns other than single monofilaments to be used to custom-design fabric properties, such as dewatering, compressibility and void volume, in a fabric that is relatively easy to install on a paper machine.

To further reduce the difference between the properties of the seam and of the fabric body, not only can the type and geometry of all three pintles 62,64,66 be selected, but stuffer yarns can also be inserted within the intermeshed seaming spirals. Seam modifications can also include the weaving in of additional yarns at seaming loops 42,44 in accordance with the teachings of U.S. Pat. Nos. 5,476,123 and 5,531,251, which teachings are incorporated herein by reference. Moreover, the seaming loops 42,44, the seaming spirals 52, and the volume defined by the interdigitated seaming spirals 52 and occupied by the pintle 66 can include flow-resistant materials. For example, the flow-resistant materials may be additional CD yarns, such as monofilament, multifilament, texturized, braided, knitted or spun yarns of appropriate weight and size to provide a required level of flow resistance. The additional CD yarns may have cross sections of circular, oval, rectangular, lobed or other shapes, and may be of the same type as or different from the functional CD yarns 36. Alternatively, the flow-resistant materials may be a ribbon of woven or non-woven material or of polymeric film, or a polymeric foam or liquid resin cured to provide a desired additional flow resistance.

Figure 4A:
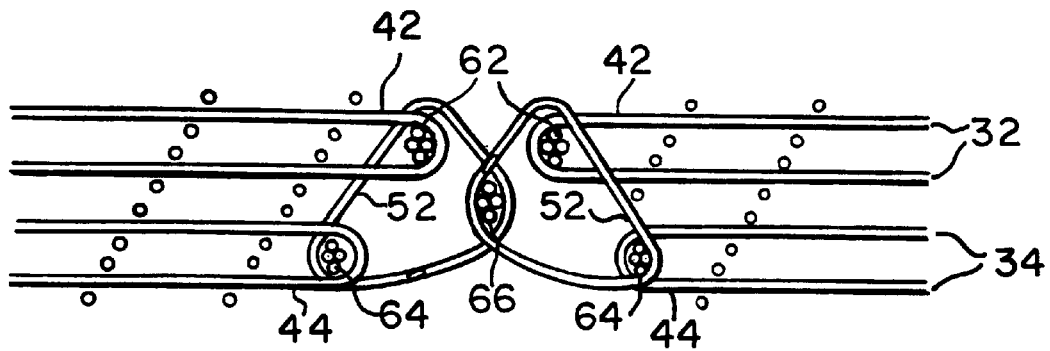
FIGS. 4a through 4c are schematic views, analogous to that shown in FIG. 3, of alternate embodiments of the invention shown in that figure.
Figure 4B:
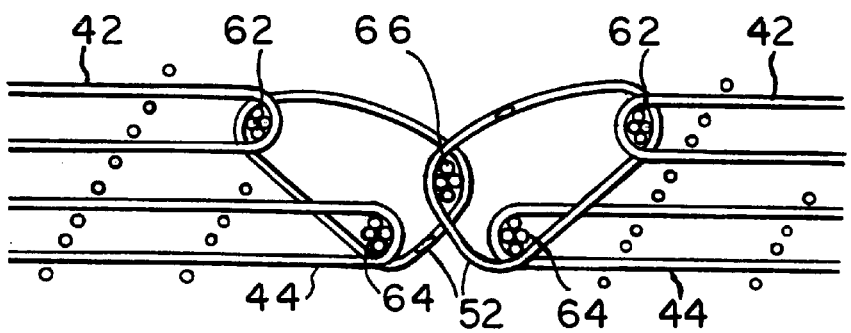
Figure 4C:
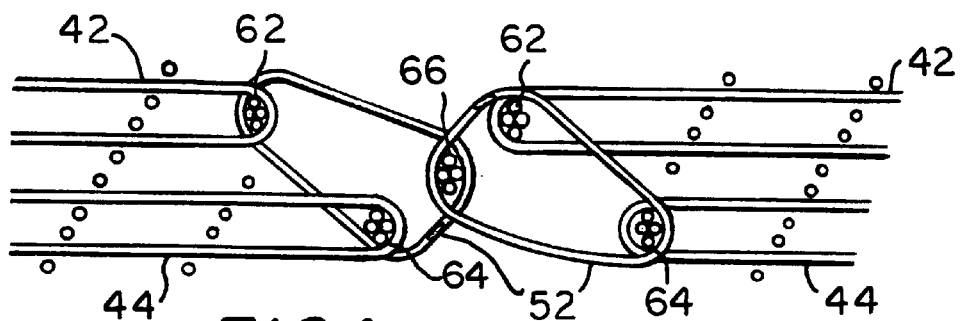

Modifications to the above would be obvious to those of ordinary skill in the art, but would not bring the invention so modified beyond the scope of the appended claims. For example, first seaming loops 42 and second seaming loops 44 may extend an equal amount in a lengthwise direction from the widthwise edges of the press fabric 10, as shown in FIG. 3. Alternatively, first seaming loops 42 and second seaming loops 44 may extend a different amount in a lengthwise direction from said widthwise edges, as shown in FIGS. 4a through 4c. In FIG. 4a, seaming loops 42 are longer than seaming loops 44 at both ends of the press fabric 10. In FIG. 4b, the reverse is the case—seaming loops 44 are longer than seaming loops 42 at both ends of the press fabric 10. In FIG. 4c, seaming loop 42 is longer than seaming loop 44 at one end of the press fabric 10, while the reverse is the case at the other end.

Figure 5A:
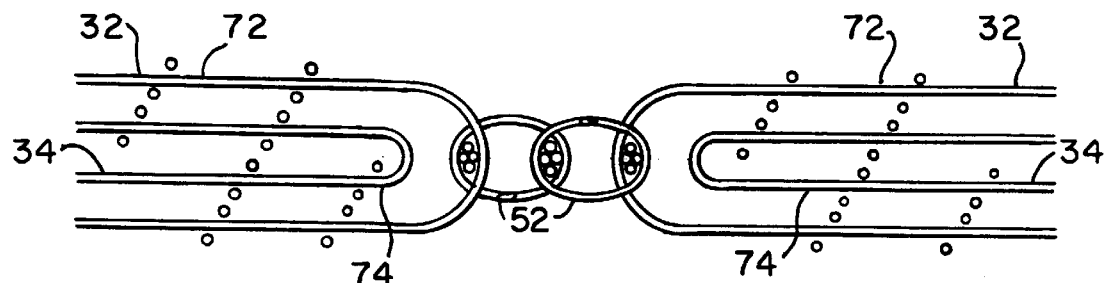
FIGS. 5a through 5c are further schematic views of alternate embodiments of the invention.
Figure 5B:
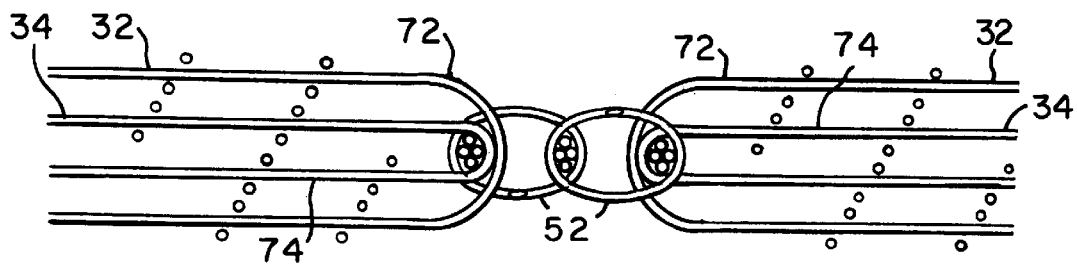
Figure 5C:
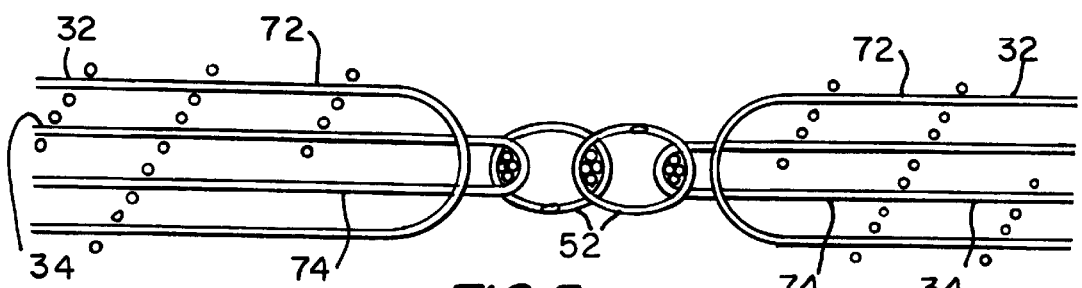

Alternatively, first MD yarns 32 may form the top and bottom layers 20,26 in FIG. 2, and second MD yarns 34 may form the middle two layers 22,24. In such a situation, illustrated in FIGS. 5a through 5c, first MD yarns 32 form first seaming loops 72, and second MD yarns 34 form second seaming loops 74, along the widthwise edges of the press fabric 10. In FIG. 5a, seaming loops 72 are longer than seaming loops 74 at both ends of the press fabric 10. In FIG. 5b, seaming loops 72 and seaming loops 74 extend the same amount from both ends of the press fabric 10. Finally, in FIG. 5c, seaming loops 74 are longer than seaming loops 72 at both ends of the press fabric 10. Because of the unequal lengths of seaming loops 72 and seaming loops 74 in FIGS. 5a and 5c, seaming spirals 52 may be joined to only one of the two seaming loops 72,74 at each end of the press fabric 10.

Other modifications may become apparent to those of ordinary skill in the art.

What is claimed is:

1. An on-machine-seamable press fabric for the press section of a paper machine, said press fabric comprising:

a system of first machine-direction (MD) yarns, a system of second machine-direction (MD) yarns, and at least one system of cross-machine-direction (CD) yarns, said at least one system of CD yarns being interwoven with said systems of first and second MD yarns to form an integrally woven multi-layered structure in a rectangular shape with a length, a width, two lengthwise edges and two widthwise edges, said first and second MD yarns forming first and second seaming loops, respectively, along each of said two widthwise edges thereof;

a first seaming spiral attached to at least one of said first and second seaming loops at one of said two widthwise edges of said press fabric by a first pintle;

a second seaming spiral attached to at least one of said first and second seaming loops at the other of said two widthwise edges of said press fabric by a second pintle, whereby said press fabric is joined into endless form during installation on the press section of a paper machine by interdigitating the coils of said first and second seaming spirals and by directing a third pintle through the passage defined by the interdigitated coils of said first and second seaming spirals.

2. An on-machine seamable press fabric as claimed in claim 1 wherein said first and second seaming loops are in two distinct rows separated from one another in a thicknesswise direction of the press fabric.

3. An on-machine-seamable press fabric as claimed in claim 2 wherein said two distinct rows of said first and second seaming loops are vertically stacked relative to one another.

4. An on-machine-seamable press fabric as claimed in claim 3 wherein said first and second seaming loops extend an equal amount in a lengthwise direction from said widthwise edges.

5. An on-machine-seamable press fabric as claimed in claim 3 wherein said first and second seaming loops extend a different amount in a lengthwise direction from said widthwise edges.

6. An on-machine-seamable press fabric as claimed in claim 2 wherein said two distinct rows of said first and second seaming loops are offset from one another in a lengthwise direction.

7. An on-machine-seamable press fabric as claimed in claim 2 wherein said first seaming spiral is attached to both of said first and second seaming loops at one of said two widthwise edges of said press fabric by said first pintle and a fourth pintle, respectively; and wherein said second seaming spiral is attached to both of said first and second seaming loops at the other of said two widthwise edges of said press fabric by said second pintle and a fifth pintle, respectively.

8. An on-machine-seamable press fabric as claimed in claim 1 wherein said first and second seaming loops extend a different amount in a lengthwise direction from said widthwise edges.

9. An on-machine-seamable press fabric as claimed in claim 1 wherein said first and second seaming loops extend an equal amount in a lengthwise direction from said widthwise edges.

10. An on-machine-seamable press fabric as claimed in claim 1 wherein said first seaming spiral is attached to both of said first and second seaming loops at one of said two widthwise edges of said press fabric by said first pintle; and wherein said second seaming spiral is attached to both of said first and second seaming loops at the other of said two widthwise edges of said press fabric by said second pintle.

11. An on-machine-seamable press fabric as claimed in claim 1 wherein said first and second seaming spirals are monofilament spirals.

12. An on-machine-seamable press fabric as claimed in claim 11 wherein said monofilament spirals are extruded from a polymeric resin material.

13. An on-machine-seamable press fabric as claimed in claim 12 wherein said polymeric resin material is selected from the group consisting of polyamide, polyester, polyetherketone, polypropylene, polyolefin and polyethylene terephthalate (PET) resins.

14. An on-machine-seamable press fabric as claimed in claim 1 wherein said system of first MD yarns forms two layers of said integrally woven multi-layered structure.

15. A on-machine-seamable press fabric as claimed in claim 1 wherein said system of second MD yarns forms two layers of said integrally woven multi-layered structure.

16. An on-machine-seamable press fabric as claimed in claim 1 wherein said first MD yarns and said second MD yarns are weft yarns, and said CD yarns are warp yarns, during a modified endless weaving process by which said fabric is produced.

17. An on-machine-seamable press fabric as claimed in claim 1 wherein a plurality of layers of staple fiber material are attached to at least one side thereof.

18. An on-machine-seamable press fabric as claimed in claim 17 wherein said staple fiber material comprises staple fibers of a polymeric resin material.

* * * * *